United States Patent [19]
Rovner

[11] Patent Number: 5,179,488
[45] Date of Patent: Jan. 12, 1993

[54] PROCESS CONTROL INSTRUMENT WITH LOOP OVERCURRENT CIRCUIT

[75] Inventor: Bruce D. Rovner, Eden Prairie, Minn.

[73] Assignee: Rosemount Inc., Eden Prairie, Minn.

[21] Appl. No.: 558,244

[22] Filed: Jul. 26, 1990

[51] Int. Cl.⁵ .............................................. H02H 3/08
[52] U.S. Cl. ...................................... 361/18; 361/58; 361/82; 361/84
[58] Field of Search ...................... 361/56, 58, 91, 111, 361/84, 18, 82

[56] References Cited

U.S. PATENT DOCUMENTS

| | | | |
|---|---|---|---|
| 3,582,713 | 6/1971 | Till | 361/18 |
| 3,975,719 | 8/1976 | Frick | 340/200 |
| 3,992,650 | 11/1976 | Iwasa | 317/33 |
| 4,481,967 | 11/1984 | Frick | 137/85 |
| 4,533,970 | 8/1985 | Brown | 361/58 |
| 4,665,938 | 5/1987 | Brown | 137/85 |
| 4,678,984 | 7/1987 | Henze | 323/285 |
| 4,783,659 | 11/1988 | Frick | 340/870.37 |
| 4,857,985 | 8/1989 | Miller | 361/82 |

FOREIGN PATENT DOCUMENTS 3026740 2/1982 Fed. Rep. of Germany .
2627920 9/1989 France .

Primary Examiner—Todd E. DeBoer
Attorney, Agent, or Firm—Kinney & Lange

[57] ABSTRACT

A process control instrument receives a DC current from a two wire loop and has overcurrent protection and reverse current protection circuits which pass a portion of the DC current as a device current to a process controlling device. The overcurrent protection circuit includes a current sensing circuit which conducts the device current and generates an output indicative of device current. The overcurrent protection circuit also includes a current diverting circuit coupled across the two wire loop and responsive to the sensor output for diverting loop current in excess of a predetermined upper limit of device current back to the loop when the sensor output indicates the upper limit is reached. The reverse current protection circuit is coupled across the loop and includes a variable impedance which conducts the device current. The variable impedance inhibits the device current from flowing through the device when a loop potential is reversed from a predetermined polarity. Thus, the device current is limited to a current range controlled by the variable impedance and the upper limit.

21 Claims, 2 Drawing Sheets

PROCESS CONTROL INSTRUMENT WITH LOOP OVERCURRENT CIRCUIT

BACKGROUND OF INVENTION

This invention relates to industrial process control instruments such as pressure transmitters, current to pressure (I/P) converters, and the like having overcurrent and reverse current protection circuits.

In industrial process control systems, overcurrent and reverse current protection circuits operate between a two-wire DC current loop and a process control instrument. These protection circuits reduce the incidence of damage or degradation to the process control instrument from excessive and reverse polarity currents from the loop. Examples of such process control instruments include pressure, temperature, flow, pH, conductivity and the like transmitters, are shown for example in U.S. Pat. No. 3,975,719, and current to pressure converters, valve actuators and the like, are shown for example in U.S. Pat. No. 4,481,967, both assigned to the assignee of the present application and incorporated herein by reference.

Although a variety of operating ranges are used, two wire transmitters and I/P's typically operate in a loop current range of 4 to 20 mA, where loop current flows in one continuous loop. Energization of the loop is typically limited to a lower energy level incapable of igniting a combustible atmosphere. Therefore, since process control instruments operate remotely from control centers, the potential drops induced in each the loop wires supplying loop current and the process control instrument are critical in determining a maximum wire length for remote operation of the process control instrument. The application of process control instruments in the industrial process industry requires careful consideration of several system design parameters including lift-off potential of the process control instrument, which is desired to be reduced. Lift-off potential is a minimum potential necessary at an instrument to ensure that the process control instrument operates properly. Reducing potential drops of the overcurrent and reverse current protection circuits, each of which increase the lift-off potential of the process control instrument, allows for an increased potential drop in the loop wire thus increasing permissible wire length.

Some instruments include a diode in series with the two wire loop to block the flow of reverse current, as taught in U.S. Pat. Nos. 3,975,719 and 4,783,659 for two wire transmitters, both assigned to the assignee of the present application and hereby incorporated by reference. The diode produces a large potential drop in the instrument when current flows in the proper direction, which significantly increases the lift-off voltage and reduces the permissible wire length.

U.S Pat. Nos. 3,975,719 and 4,783,659 also teach overcurrent protection circuits in two wire current transmitters. These Patents teach a resistor in series with the two wire loop and connected to the emitter of a transistor with one end of a Zener diode connected to a remote end of the resistor and the other end of the Zener diode connected to the base of the transistor. While this combination limits the maximum value of the loop current, a large potential drop is produced across the resistor during normal operation which further contributes to increasing the lift-off potential of the process control instrument.

There is a need to provide a protection circuit that protects a process control instrument from large and reverse polarity currents from a loop where the currents can damage or degrade the instrument, while reducing the potential drop in the loop thus reducing a lift-off potential of the instrument. Further, there is a need to provide a protection circuit which diverts substantially no current back to the loop during normal operation thus improving accuracy of the instrument, in a simple, reliable and cost effective manner. A circuit that is substantially undamaged by either a decreased impedance or a short circuit of the two wire loop is desirable.

SUMMARY OF THE INVENTION

In the present invention, a process control instrument includes overcurrent and reverse current protection circuits, having reduced potential drops and reduced leakage currents, to reduce incidence of damage or degradation to a process control instrument, such as a pressure, temperature, flow, pH, or conductivity transmitter; or a current to pressure (I/P) converter, a valve actuator, or the like.

The overcurrent protection circuit receives a DC loop current from a two wire loop and passes a portion of the loop current through the process control instrument as a device current. First current sensing means conducting the device current between the loop and the device provides a first output indicative of the device current amplitude. Current diverting means coupled across the two wire loop responds to the first output when device current flows at an upper limit by diverting a portion of the loop current back to the loop as a shunt current. Second current sensing means conducts the shunt current and provides a second output indicative of the shunt current amplitude. First impedance means having a first variable impedance conducting the device current responds to the second output by varying the first impedance to limit the device current to no greater than a predetermined upper limit.

The reverse current protection circuit conducts the device current between the loop and the process control device and responds to the loop potential. The circuit has second impedance means having a second variable impedance for inhibiting the device current from flowing through the device when the loop potential is reversed from a predetermined polarity. The circuit diverts substantially no device current back to the loop when loop potential comprises a proper polarity and loop current is within the predetermined normal range.

DETAILED DESCRIPTION OF THE PREFERRED EMBODIMENTS

Figure 1:
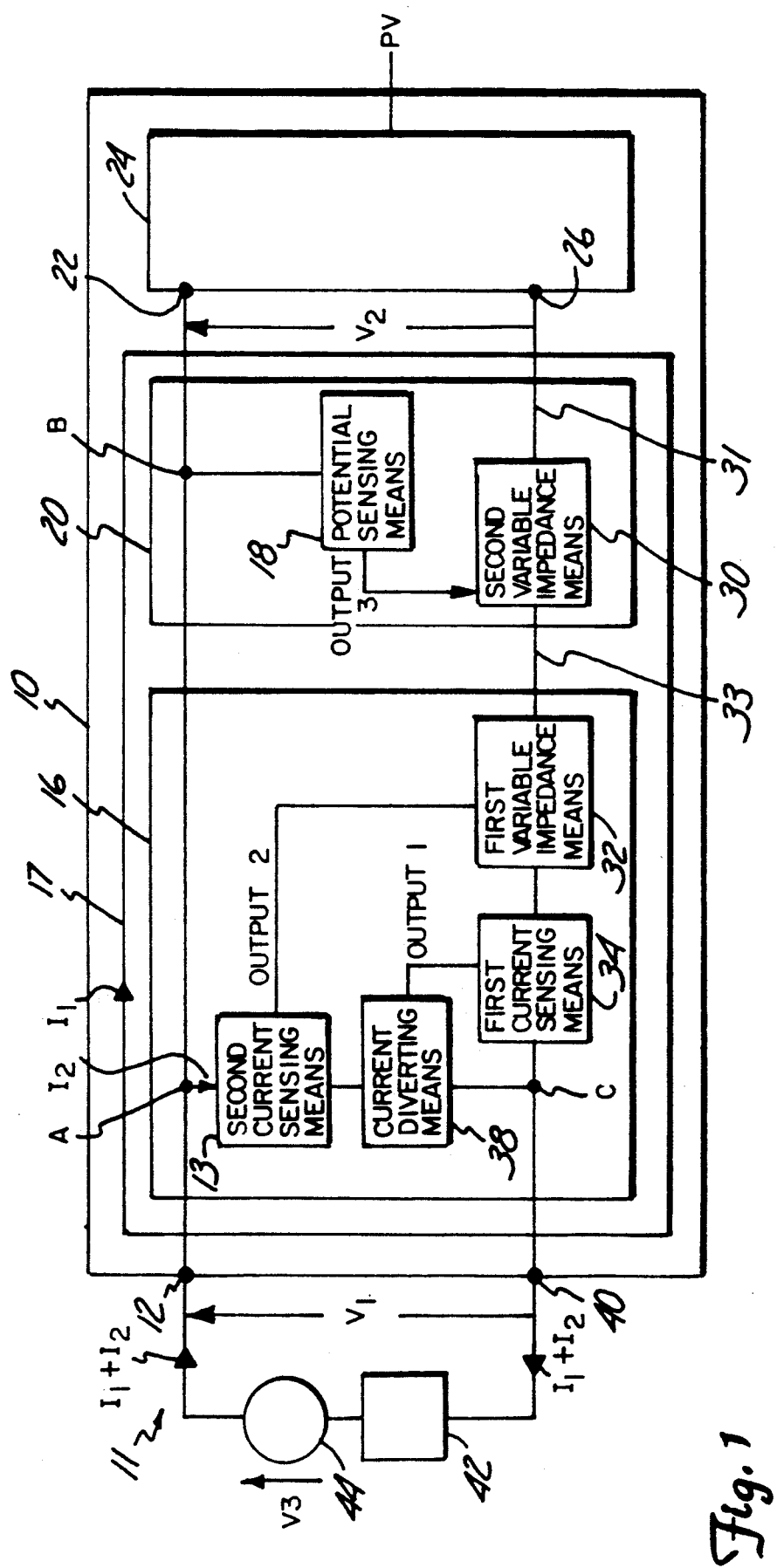
FIG. 1 is a block diagram representation of a first embodiment of a two-wire process control instrument having an overcurrent and reverse current protection circuit according to the present invention.

FIG. 1 shows a block diagram of a first embodiment of two-wire process control instrument 10 wired in series with power source 44 and a separate process control device 42 to form two-wire loop 11 carrying a DC loop current. For example, under fault conditions, loop current or voltage can exceed a predetermined normal range, e.g. 0–60 mA for a 4–20 mA loop where 60 mA is an upper limit, which would damage or degrade performance of process control device 24, such as a pressure transmitter, in process control instrument 10. To reduce incidence of damage or degradation to process control device 24 from excessive and reverse polarity current, instrument 10 includes protection circuit 17 coupling current from loop 11 to device 24. Protection circuit 17 receives DC loop current $I_1+I_2$ and passes only normal current or device current $I_1$ of the loop current on to device 24. Circuit 17 limits device current $I_1$ to a level in the normal range which prevents or reduces degradation of device 24. The remainder of the loop current, shunt current or overcurrent $I_2$, is shunted back to loop 11 for controlling the level of device current $I_1$. Shunt current $I_2$ is substantially zero until amplitude of normal current $I_1$ attains the upper limit in the normal range.

Process control device 24, such as a pressure transmitter as disclosed, senses process variable "PV" as illustrated in FIG. 1. Process control device 24 controls amplitude of variable normal current $I_1$ as a function of amplitude of process variable PV and process control device 42 functions as a current sensing instrument, such as a recorder, by sensing amplitude of loop current $I_1+I_2$, and correlating loop current amplitude to the process variable PV.

On the other hand, process control device 24 can be an output device, such as a current-to-pressure(I/P) converter or a current-to-position converter. In this embodiment, the separate process current control device 42, such as a controller, controls amplitude of loop current $I_1+I_2$, and process control device 24 controls the magnitude of its output, process variable PV, as a function of amplitude of variable normal current $I_1$.

The process control device 24 can also include a circuit for generating and receiving a time-varying-signal sent over loop 11 such as taught in U.S. Pat. No. 4,665,938 to Brown et al., hereby incorporated by reference.

The present invention is suitable for use in a process control system utilizing multidrop process instruments, such as pressure transmitters, each connected in parallel across a two wire loop and processing information by superimposing digital data over a DC line.

Loop 11 provides loop current $I_1+I_2$ to terminal 12 in instrument 10, which returns loop current to loop 11 from terminal 40 in instrument 10. In instrument 10, overcurrent protection circuit 16 and reverse current protection circuit 20 isolate process control device 24 from excessive currents from the loop 11. Loop current $I_1+I_2$ floss from terminal 12 to node A in overcurrent protection circuit 16. At node A, any overcurrent $I_2$ flows to current sensing means 13, while normal current $I_1$ flows to node B in reverse current protection circuit 20, as will be explained later. From node B, normal current $I_1$ flows on to terminal 22 of process control device 24. Normal current $I_1$ flows through process control device 24 back through terminal 26 of process control device 24 to conductor 31. Normal current $I_1$ flows from conductor 31 through reverse current protection circuit 20 to conductor 33 and on through overcurrent protection circuit 16 to node C of overcurrent protection circuit 16. At node C, overcurrent $I_2$ from current diverting means 38 is summed with normal current $I_1$ such that the entire loop current $I_1+I_2$ flows from node C out through terminal 40 back to loop 11.

Normal current $I_1$ flowing through process control device 24 induces potential $V_2$ across terminals 22 and 26. Potential $V_2$ is representative of polarity of loop current $I_1+I_2$. Potential sense means 18 coupled across a portion of loop 11 senses potential $V_2$ and generates output 3 indicative of potential $V_2$. Potential sense means 18 diverts substantially no device current $I_1$ back to loop 11 when loop potential $V_2$ is a proper polarity. When potential sense means 18 senses loop potential $V_2$ to be the proper polarity, impedance of variable impedance 30 is reduced in response to output 3 and normal current $I_1$ flows freely through process control device 24 and through variable impedance means 30 to overcurrent protection circuit 16. When, instead, potential sense means 18 senses potential $V_2$ as reversed from the proper polarity or insufficient in magnitude, then impedance of variable impedance 30 is increased in response to output 3 thus reducing normal current $I_1$ flowing through process control device 24 and variable impedance means 30. Thus, reverse current protection circuit 20, having variable impedance 30 conducting device current $I_1$, is responsive to output 3 which is a function of a loop potential $V_2$, the protection circuit 20 diverting substantially no device current $I_1$ back to loop 11 when loop potential $V_2$ is the proper polarity.

Amplitude of normal current $I_1$ flowing through current sense means 34 controls the level of output 1. The variable impedance of current diverting means 38 is responsive to the level of output 1. When normal current $I_1$ flows at the predetermined upper level, output 1 reaches a level such that the impedance of current diverting means 38 is reduced so that shunt current $I_2$ now flows through current diverting means 38 and also through current sense means 13, which is in series with current diverting means 38. The amplitude of shunt current $I_2$ flowing through current sense means 13 controls the level of output 2. The level of output 2, which is indicative of shunt current $I_2$, controls the impedance of variable impedance 32. The impedance of variable impedance 32 controls the amplitude of normal current $I_1$ flowing from loop in series through process control device 24 and variable impedance 32 such that normal current $I_1$ does not exceed the predetermined normal range.

Hence, overcurrent protection circuit 16, which senses the magnitude of device current $I_1$, prevents device current $I_1$ from exceeding a predetermined upper limit which can damage or degrade the performance of process control device 24 even when loop current exceeds the predetermined upper limit. Further, the circuit induces a reduced potential drop in the two wire loop. Moreover, the circuit is relatively insensitive to the impedance of the additional device 42.

Figure 2:
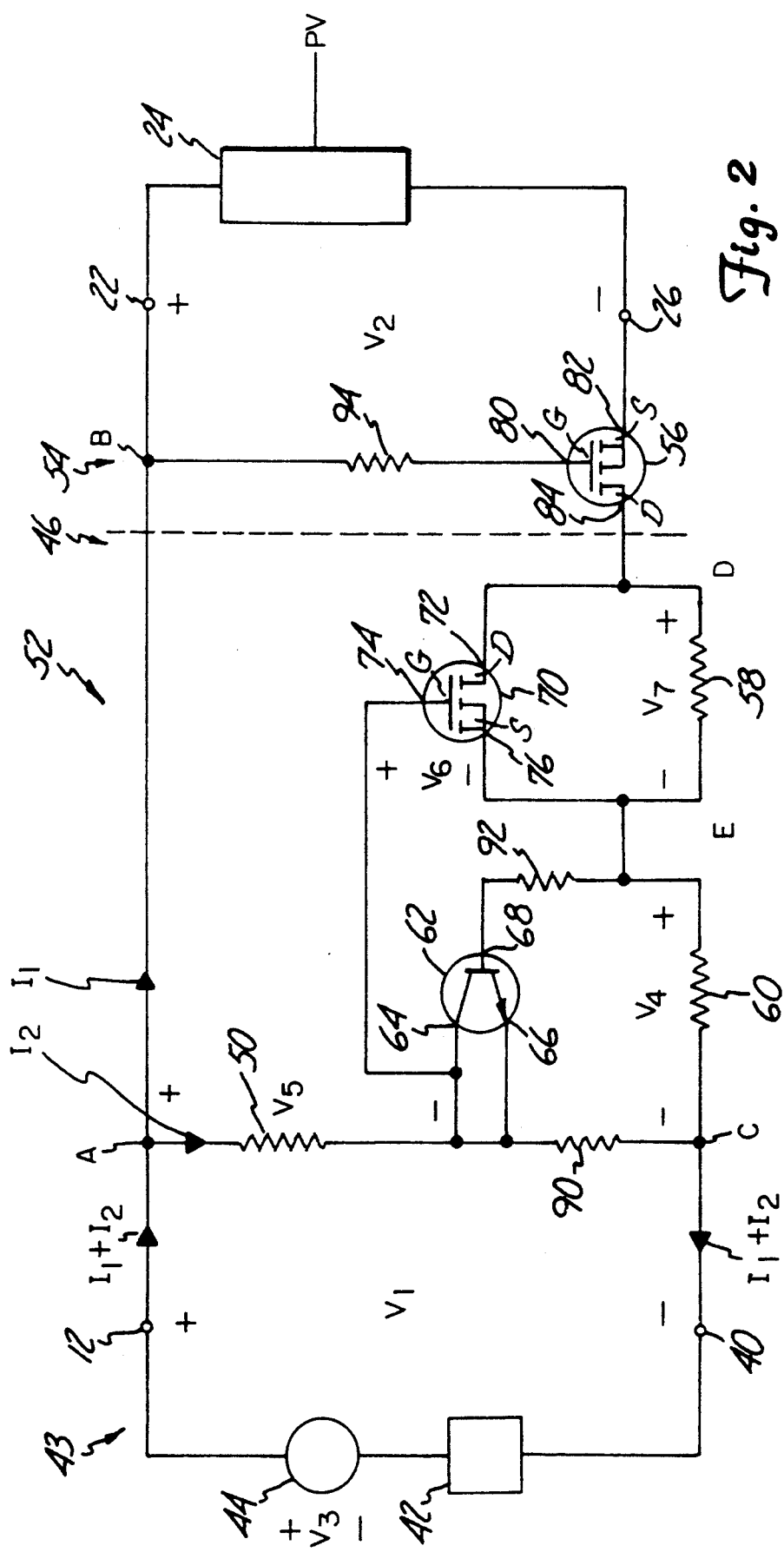
FIG. 2 is a schematic representation of a second embodiment of a process control instrument having an overcurrent and reverse current protection circuit according to the invention.
Figure 2:
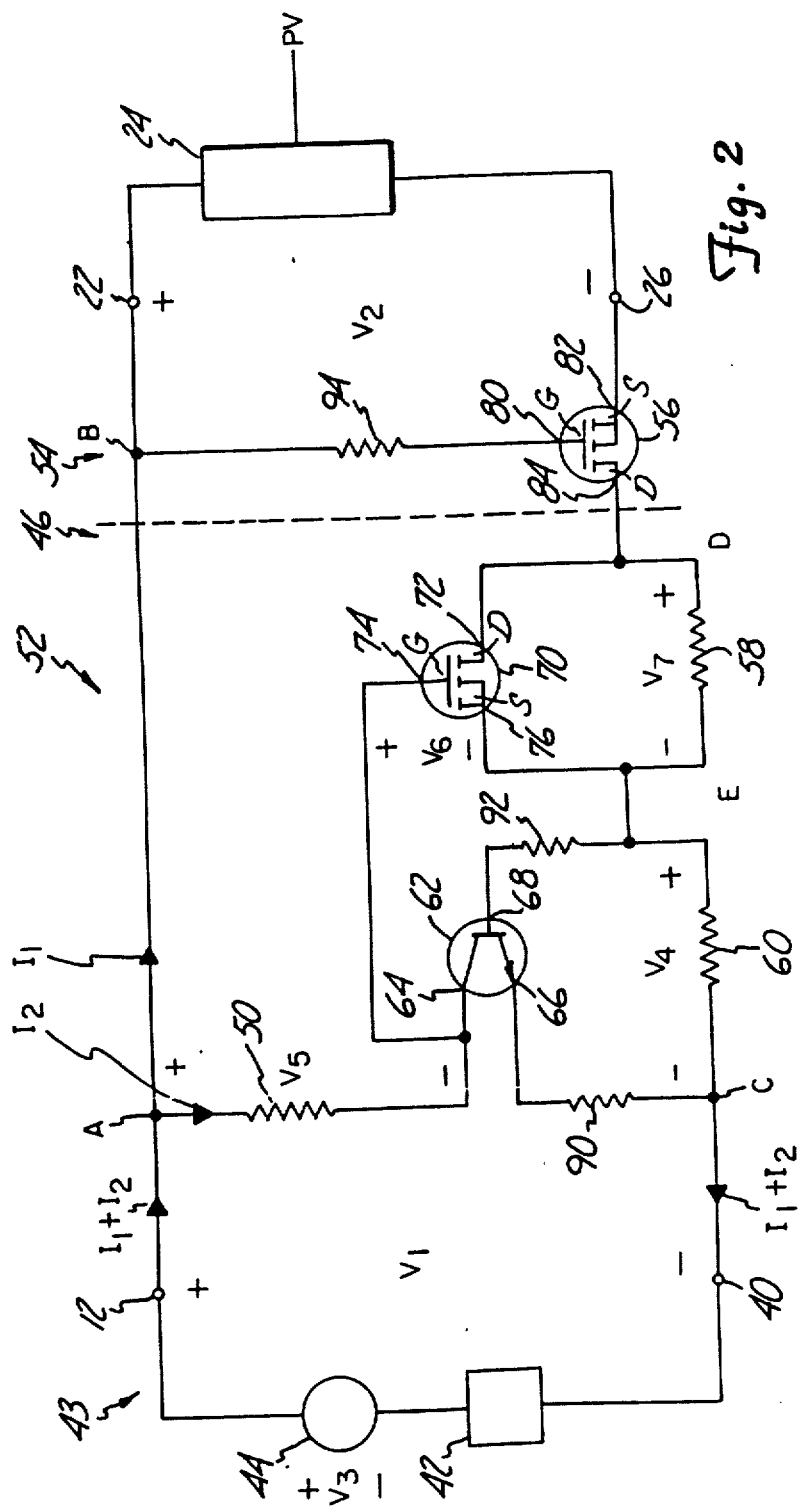

FIG. 2 shows a schematic diagram of a second embodiment of two-wire process control instrument 46 wired in series with power source 44 and process control device 42 to form two-wire loop 43 carrying a DC loop current. Instrument 46 comprises overcurrent protection circuit 52, reverse current protection circuit 54 and process control device 24 where the two circuits are interposed between the loop 43 and the process control device 24. Overcurrent protection circuit 52 passes only normal current or device current $I_1$ of loop Current through reverse current protection circuit 54 to process control device 24. The remainder of the loop current, shunt current or overcurrent $I_2$, is shunted by overcurrent protection circuit 52 back to loop 43. Overcurrent $I_2$, as described later, generates an output which controls the impedance between nodes D and E to maintain the level of normal current $I_1$, which flows between nodes D and E, in the normal range. Overcurrent $I_2$ is substantially zero until device current $I_1$ attains the predetermined upper limit.

Two-wire loop 43 provides varying DC loop current $I_1+I_2$ to terminal 12 of overcurrent protection circuit 52. Loop current $I_1+I_2$ flows from terminal 12 to node A. At node A, shunt current $I_2$ flows to resistor 50, while normal current $I_1$ flows to node B in reverse current protection circuit 54. At node B, normal current $I_1$ is passed on to terminal 22 of process control device 24. Normal current $I_1$ flows through process control device 24 to terminal 26 of process controlling device 24 and on to node D. Normal current $I_1$ flows from node D through node E to node C in overcurrent protection circuit 52. At node C, shunt current $I_2$ from transistor 68 is summed with normal current $I_1$ such that the entire loop current $I_1+I_2$ flows from node C out through terminal 40 of process control instrument 10 back to loop 43.

Normal current $I_1$ flowing through process control device 24 induces potential $V_2$ across terminals 22 and 26. Potential $V_2$ is representative of polarity of loop current $I_1+I_2$. Enhancement type field-effect transistor (FET) 56 coupled across terminals 22 and 26 senses polarity of potential $V_2$ via resistor 94 across gate 80 and source 82. Substantially no device current is diverted back to loop 43 from gate 80 to source 82, unlike the leakage from a base to an emitter if a bipolar transistor were substituted for FET 56. Leakage current reduces the accuracy of process control instruments and is undesirable. When loop current $I_1+I_2$ is of correct polarity, FET 56 is enhanced by potential $V_2$ and is turned on, where impedance across source 82 to drain 84 is substantially reduced to zero such that normal current $I_1$ flows freely through process control device 24 and FET 56 from source 82 to drain 84. Substantially no potential drop is induced in loop 43 by reverse current protection 54 when FET 56 conducts device current $I_1$ since impedance from source 82 to drain 84 is substantially zero in comparison with other loop impedances. When loop current $I_1+I_2$ is reversed from the correct polarity such that damage to process control device 24 could occur, FET 56 operates in a depletion mode and is turned off, such that impedance from source 82 to drain 84 is increased thus substantially reducing normal current $I_1$ flowing through process control device 24.

Reverse current protection circuit 54 operates independently from overcurrent protection circuit 52 and can be interposed between loop 43 and overcurrent protection circuit 52 and conducting the loop current $I_1+I_2$. It can also be interposed between loop 43 and process control device 24 when overcurrent protection circuit 52 is omitted thus conducting device current $I_1$ which here is the same as the loop current.

Normal current $I_1$ flowing from node E to node C through current sensing resistor 60 induces potential $V_4$ which is indicative of the amplitude of normal current $I_1$. When normal current $I_1$ attains the upper limit of the normal operating range, potential $V_4$ across base 68 to emitter 66 biases current diverting means bipolar transistor 62 on, which can also be a FET or the like. Biasing transistor 62 on allows shunt current $I_2$ to flow from node A through current sensing resistor 50, transistor 62 via collector 64 to emitter 66, and resistor 90 to node C.

Shunt current $I_2$ induces potential $V_5$ across resistor 50 which is indicative of the amplitude of shunt current $I_2$. Resistor 50 can also comprise other current sensing means that generates a potential corresponding a current, such as a transistor. Potential $V_5$ generates potential $V_6 = V_1 - V_5 - V_4$ across gate 74 and source 76 such that enhancement type FET 70, serving as a variable impedance, operates in a depletion mode and is turned off.

When FET 70 operates in the depletion mode, impedance from drain 72 to source 76 is substantially increased and substantially all normal current $I_1$ flows from node D to node E through current limiting means resistor 58 instead of through FET 70 via the drain 72 to source 76, which is in parallel with resistor 58. Resistor 58, or equivalent high impedance current limiting means, has a large power rating for dissipating a large amount of power when conducting the majority of device current $I_1$. Resistor 58 has a value such that the sum of potentials $V_2$, $V_7$ and $V_4$ induced by normal current $I_1$ flowing at the upper limit is equal to terminal potential $V_1$, thus limiting normal current $I_1$ to the upper limit. FET 70 can be substituted by a bipolar transistor; however, leakage current across the base to emitter of the bipolar transistor degrades accuracy of instrument 46.

When amplitude of normal current $I_1$ is below the upper limit of the normal range induced potential $V_4$ is insufficient to bias transistor 62 on, substantially no shunt current $I_2$ conducts through resistor 50, potential $V_5$ is substantially zero and FET 70 is enhanced and turned on. Enhanced FET 70 has a reduced impedance of substantially zero from drain 72 to source 76 and substantially all normal current $I_1$ flows from node D to node E through FET 70 via drain 72 to source 76, instead of through resistor 58, and potential $V_7$ is reduced to substantially zero. Thus, the parallel combination of FET 70 and resistor 58 functions as a variable impedance inducing a reduced potential drop for limiting device current $I_1$ to the normal range, and is responsive to potential $V_5$, which is indicative of shunt current $I_2$. During normal operation, the only substantial potential drop induced in loop 43 by overcurrent protection circuit 52 is $V_4$, which is substantially less than a potential drop of a typical forward biased diode. All other components require only minimal wattage ratings thus reducing cost, size requirements and increasing reliability. Further, overcurrent protection circuit 52 operates independently of the impedance of power source 44, and does not highly stress any components while conducting normal current $I_1$ flowing at the upper limit.

Amplitude of normal current $I_1$ below the upper limit generates a substantially reduced lift-off potential $V_1 = V_2 + V_4 + V_7$ compared to conventional protection circuits. Process control instruments having reduced lift-off potentials, such as the invention disclosed, are very useful for the industrial process control industry. First of all, the likelihood of generating sparks across terminals 12 and 40, which may ignite a combustible atmosphere, is reduced. Secondly, instrumentation with lower lift-off potentials increase the distance that a remote process control instrument can be located while operating from a safe power source level, such as that produced by power source 44. Protection circuits in process control instruments, such as the invention disclosed, that divert substantially no device current back to the loop during normal operation improve the accuracy of process control instruments.

Resistor 92, connected from node E to base 68 of transistor 62, along with resistors 90 and 94, provide intrinsic safety protection for overcurrent protection circuit 52 and reverse current protection circuit 54. The circuits, as disclosed, have no components capable of substantial energy storage, such as a capacitor or an inductor, that are capable of discharging with sufficient energy to provide a spark which can ignite an explosive atmosphere.

While the invention has been described with reference to preferred embodiments, workers skilled in the art will recognize that changes may be made in form and detail without departing from the spirit and scope of the invention.

What is claimed is:

1. A process control instrument, comprising:
   a process variable controlling device receiving a device current; and
   a current protection circuit receiving a loop current from a two wire loop and passing a portion of the loop current which is no greater than a predetermined upper limit as the device current through the device, comprising:
   first current sensing means conducting the device current between the loop and the device and generating a first output indicative of the device current;
   current diverting means coupled across the loop responsive to the first output and diverting a portion of the loop current as a shunt current back to the loop through a second current sensing means which provides a second output indicative of the shunt current; and
   impedance means having a variable impedance conducting the device current and responsive to the second output for limiting device current.

2. The instrument of claim 1 wherein the second output controls the magnitude of the variable impedance.

3. The instrument of claim 2 wherein the impedance means enables substantially all loop current to flow through the device when the loop current is no greater than the upper limit.

4. The instrument of claim 3 wherein the first and second current sensing means each comprise a separate resistor.

5. The instrument of claim 4 wherein the current diverting means comprises a transistor.

6. The instrument of claim 5 wherein the impedance means comprises a field effect transistor.

7. A process control instrument, comprising:
   a process variable controlling device receiving a device current from a two wire loop and
   a reverse current protection circuit conducting the device current between the loop and the device, the protection circuit having potential sense means coupled across the loop which generates an output indicative of the sensed loop potential, and impedance means having a variable impedance conducting the device current and responsive to the output which inhibits the device current from flowing through the device when the loop potential is reversed from a predetermined polarity, and wherein the reverse current protection circuit diverts substantially no device current back to the loop when loop potential comprises the predetermined polarity.

8. The instrument of claim 7 wherein substantially no device current flows through the device when the loop potential is reversed from the predetermined polarity.

9. The instrument of claim 8 wherein the impedance means comprises a field effect transistor.

10. A process control instrument, comprising:
    a process variable controlling device receiving a device current; and
    a current protection circuit receiving a loop current from a two wire loop and passing a portion of the loop current as the device current through the device, comprising:
    current sensing means conducting the device current and generating a sensor output indicative of the device current;
    current diverting means coupled across the loop and responsive to the sensor output and diverting loop current in excess of a predetermined upper limit of device current back to the loop when the sensor output indicates the upper limit is reached; and
    reverse current protection means coupled across the loop having a first variable impedance conducting the device current and inhibiting the device current from flowing through the device when a loop potential is reversed from a predetermined polarity, where the device current is limited to a current range controlled by the first variable impedance and the upper limit.

11. The instrument of claim 10 wherein the current diverting means further comprises a second variable impedance conducting the device current for limiting the device current to no greater than the upper limit.

12. The instrument of claim 11 wherein the first variable impedance is responsive to the loop potential and inhibits substantially all device current from flowing through the device when the loop potential is reversed from the predetermined polarity.

13. The instrument of claim 12 wherein the reverse current protection means diverts substantially no device current back to the loop when loop potential comprises the predetermined polarity.

14. The instrument of claim 13 wherein the sensor output controls the magnitude of the second variable impedance.

15. The instrument of claim 10 wherein the current diverting means enables substantially all loop current to flow through the device when loop current is no greater than the upper limit.

16. The instrument of claim 15 wherein the first and second variable impedance each comprises a separate field effect transistor, and the current sensing means comprises a resistor.

17. The circuit of claim 10 wherein the device current comprises a device range of 4 to 20 milliamperes.

18. The circuit of claim 17 wherein the two wire loop provides a loop current having a magnitude within the device range.

19. The circuit of claim 18 wherein the circuit is substantially unaffected by an impedance of the two wire loop.

20. The circuit of claim 19 wherein the device current and the loop current are substantially equal.

21. The circuit of claim 19 wherein the shunt current is substantially zero.

* * * * *

UNITED STATES PATENT AND TRADEMARK OFFICE
CERTIFICATE OF CORRECTION

PATENT NO. : 5,179,488

DATED : January 12, 1993

INVENTOR(S) : BRUCE D. ROVNER

It is certified that error appears in the above-identified patent and that said Letters Patent is hereby corrected as shown below:

Col. 4, line 43, delete "loop", insert --loop 11--

Col. 4, line 66, delete "Current", insert --current--

On the title page, The Illustrated Figure:
Cancel figure 2 and substitute corrected figure 2

Signed and Sealed this

Twenty-third Day of November, 1993

Attest:

BRUCE LEHMAN

Attesting Officer

Commissioner of Patents and Trademarks